No. 816,446. PATENTED MAR. 27, 1906.
J. C. FIDDYMENT & J. J. McNALLY.
PRESS.
APPLICATION FILED OCT. 24, 1904.
3 SHEETS—SHEET 1.
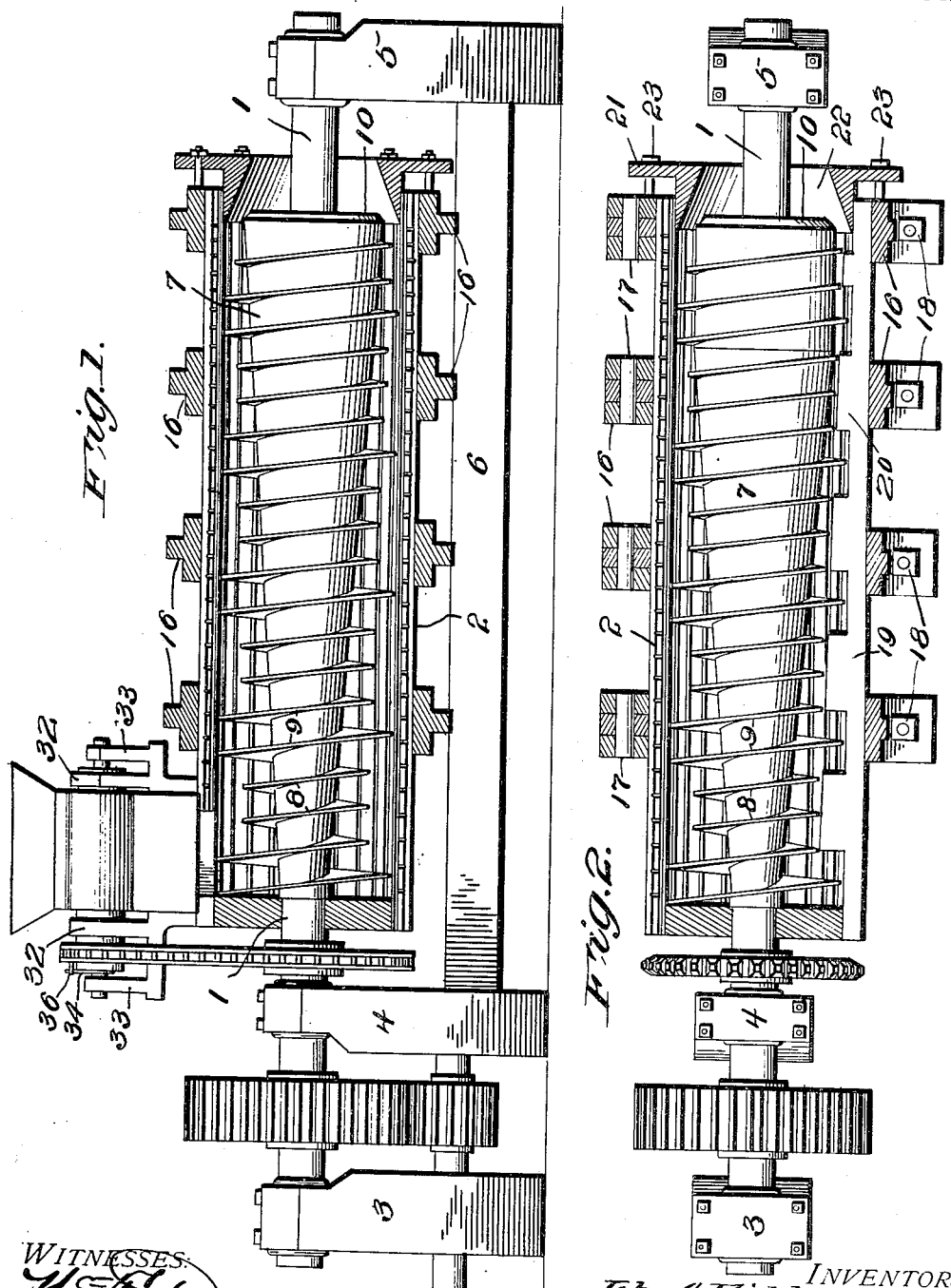
WITNESSES:
INVENTORS
John C. Fiddyment and
John J. McNally,
BY
, Attorney.

No. 816,446. PATENTED MAR. 27, 1906.
J. C. FIDDYMENT & J. J. McNALLY.
PRESS.
APPLICATION FILED OCT. 24, 1904.
3 SHEETS—SHEET 2.
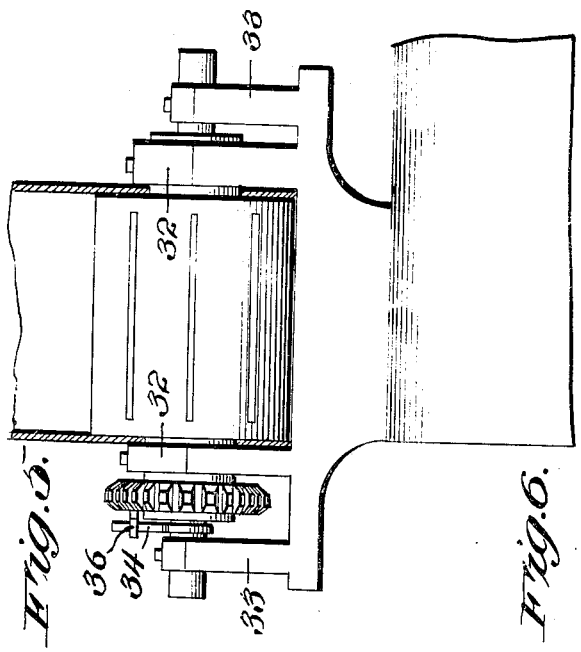
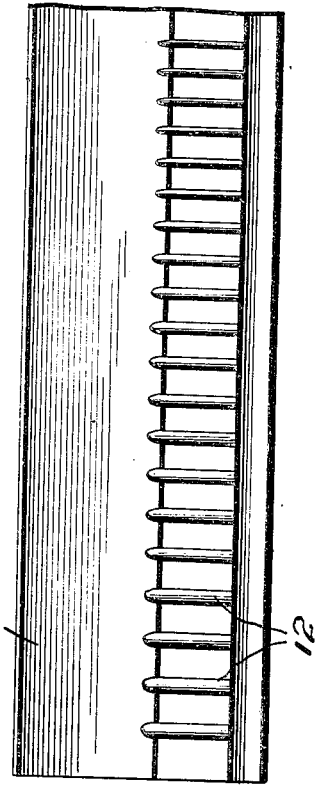
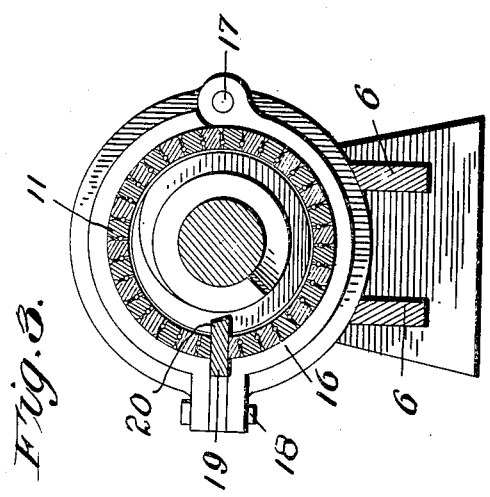
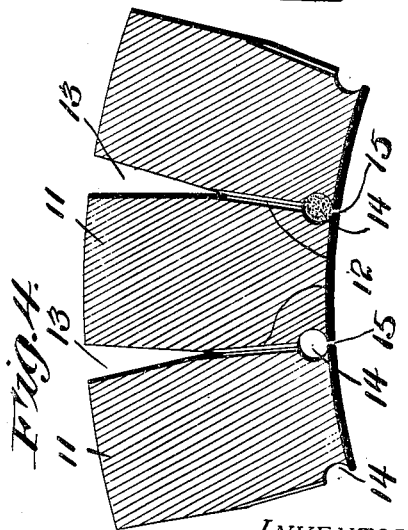
WITNESSES:
INVENTORS
John C. Fiddyment and
John J. McNally,
BY
Rexford M. Smith, Attorney.

No. 816,446. PATENTED MAR. 27, 1906.
J. C. FIDDYMENT & J. J. McNALLY.
PRESS.
APPLICATION FILED OCT. 24, 1904.
3 SHEETS—SHEET 3.
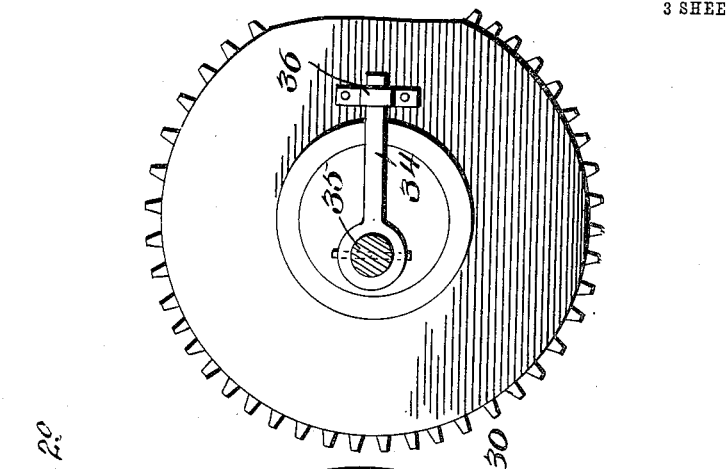
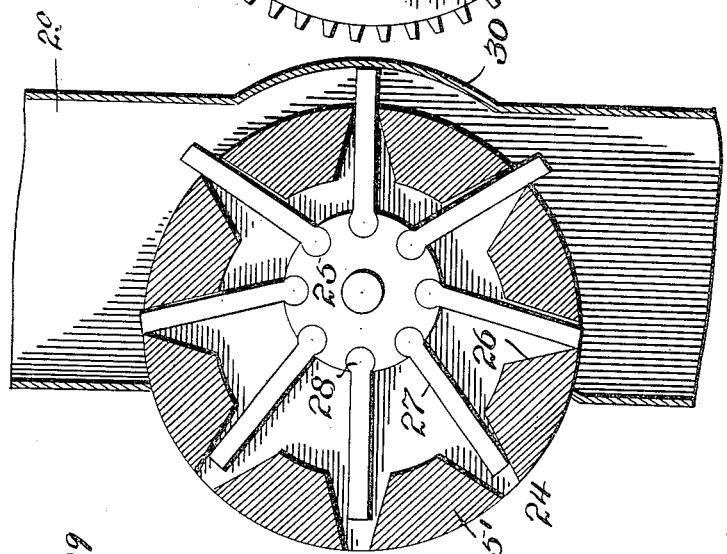
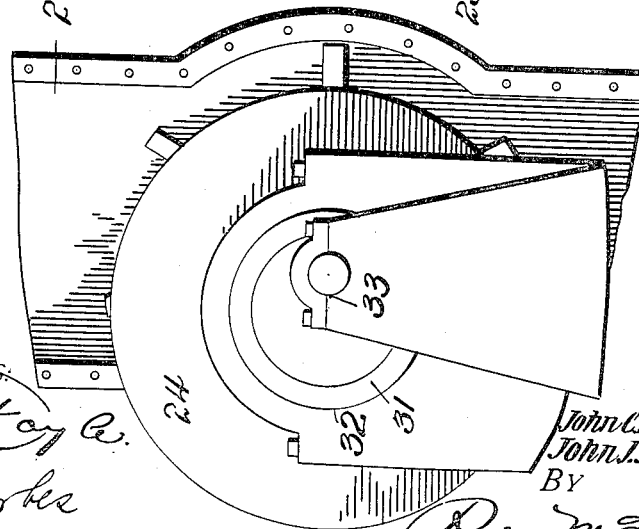

UNITED STATES PATENT OFFICE.

JOHN C. FIDDYMENT, OF BRINKLEY, ARKANSAS, AND JOHN J. McNALLY, OF NORFOLK, VIRGINIA, ASSIGNORS TO THE CONTINUOUS EXTRACTING PRESS CORPORATION, OF NORFOLK, VIRGINIA, A CORPORATION OF VIRGINIA.

PRESS.

No. 816,446.　　　Specification of Letters Patent.　　　Patented March 27, 1906.

Application filed October 24, 1904. Serial No. 229,787.

*To all whom it may concern:*

Be it known that we, JOHN C. FIDDYMENT, a resident of Brinkley, Monroe county, State of Arkansas, and JOHN J. McNALLY, a resident of Norfolk, in the county of Norfolk and State of Virginia, citizens of the United States, have invented a certain new and useful Press, of which the following is a specification, reference being had therein to the accompanying drawings.

This invention relates to presses for the crushing and extraction of oil or liquid from vegetable seeds, such as cotton-seed, castor-beans, nuts of various kinds, fish, brewers' and packing-house products, and any material containing liquid.

One object of the present invention is to provide a press which will act uniformly on the material as it passes through the machine and at the same time avoid any tendency of the mass of material to rotate within the press-chamber as it is advanced toward the discharge end of the same. With presses of the ordinary construction there is a constant tendency on the part of the material to rotate with the expressing-screw and also to become wadded or congested in the press-chamber on account of greater pressure being exerted on the material at one point, and this often results in a severe injury to the press or the breakage of some portion thereof.

The present invention overcomes the difficulty above referred to by the use of a screw of peculiar form and construction whereby the material is cut up or divided at one or more places in its passage through the machine and also advanced or fed along uniformly, and thus prevented from being compacted to too great an extent at any point within the press-chamber. Special means are also provided for preventing the material from rotating during the pressing action, and said means are so related to the feeding means and the means for cutting up or dividing the material that said material will readily adjust itself to the several elements referred to and the compression will be equalized.

A further object of the invention is to provide means for regulating the final pressure given to the mass as it is being discharged from the machine and also means for holding the mass in drainage just prior to its final discharge.

With the above and other objects in view, the nature of which will more fully appear as the description proceeds, the invention consists in the novel construction, combination, and arrangement of parts, as hereinafter fully described, illustrated, and claimed.

In the accompanying drawings, Figure 1 is a vertical longitudinal section through a press embodying the present invention. Fig. 2 is a horizontal longitudinal section through the same. Fig. 3 is a vertical cross-section through the press. Fig. 4 is an enlarged detail cross-section through several of the longitudinal slats or bars. Fig. 5 is a side elevation of the feeder. Fig. 6 is a plan view of one of the slats or bars looking toward the inner grooved face thereof. Fig. 7 is a view in elevation of the feed looking toward one end of the drum with the adjacent side of the casing removed. Fig. 8 is a vertical sectional view of the feeder. Fig. 9 is an end view of a portion of the feeder mechanism.

Like reference-numerals designate corresponding parts in all the figures of the drawings.

The press contemplated in this invention comprises essentially, a feed-screw 1, with a special form of flight or thread and mounted within a casing 2, preferably of cylindrical shape, said casing being firmly supported by a suitable framework and the screw 1 being journaled in bearings connected with and forming parts of such framework. A simple form of frame comprises a series of bearing standards or pedestals 3, 4, and 5, which are connected by longitudinal beams 6, the journal portions of the feed-screw shaft being received in the said bearing-standards and the cylindrical casing being mounted upon and secured to the longitudinal beams 6, as clearly shown in the drawings. The feed-screw is mounted to rotate within the casing and embodies a tapering body 7, which gradually increases in size from the receiving end of the press-chamber toward the discharge or delivery end thereof, a gradually tapering and contracting annular space being thus left between the surface of the body 7 and the inner wall of the press-chamber. In carrying out the present invention the tapering body of the feed-screw is provided with a spiral flight or series of screw-threads, as shown in Figs. 1 and 2, and said flight or threads are of peculiar construction and arrangement, the threads being alternately large and small. The smaller threads (shown at 8) project only a portion of the way from the body 7 toward the inner wall of the press-chamber, while the larger threads 9 project to within a very short distance of the wall of the press-chamber. The smaller threads, which serve to advance the material along the press-chamber, alternate with the larger threads, which serve to cut up, divide, or separate the material during its progress through the machine and also advance the material at the same time. In this way the pressure on the mass within the press-chamber is distributed and equalized and undue pressure, wadding, and congestion at one or more points obviated, the material being divided as it is advanced or fed along. As illustrated, about two small threads intervene between each pair of large threads; but it is to be understood that the number of threads of each character may be increased or diminished at will, as may also the entire number of threads on the feed-screw, thus providing for any desired pitch of thread and consequent speed of feed of the material through the press. The shaft 1 of the screw will be suitably shouldered adjacent to its bearings to prevent end thrust. The discharge end of the body 7 is also preferably rounded off or chamfered, as shown at 10, to facilitate the delivery of the compressed material from the press.

The cylinder or casing 2 is composed of a circular series of longitudinal slats or bars 11. These extend the entire length of the press-chamber, and their inner faces form the inner wall of the press-chamber. The side faces of the slats abut directly against each other for approximately one-half their extent or area, while the remainder of their side faces are beveled to form flaring or outwardly-expanding exits for the juice or liquid as it escapes from the press-chamber. The abutting faces of the slats are transversely grooved at opposite points to form drain-ports 12, which communicate at their outer ends with the flaring exits 13 and at their inner ends open into strainer-passages 14, which extend lengthwise of the slats and are located adjacent to the inner wall of the press-chamber, as best shown in Fig. 4, narrow spaces or slits 15 being left at the inner corners of the slats to receive the liquid and admit the same to the strainer-passages, the latter being adapted to receive strips of absorbent or filtering material, which allow the liquid to pass, but arrest solids. The slats or bars 11 are all secured to rings or hoops 16, which encircle the slats, as shown in Figs. 1, 2, and 3. These bands or hoops are preferably made in semicircular sections, as best shown in Fig. 3, and said sections are by preference hinged together at one side of the press, as shown at 17, and connected at the opposite side by bolts 18 or their equivalent in order that the upper portion of the press-chamber may be opened up and thrown back to give access to the interior thereof, the lower half of the press-chamber thus formed being secured rigidly to the framework of the machine.

In order to prevent rotation of the material as it is fed along through the press-chamber, use is made of one or more baffles 19, one of such baffles being shown in Figs. 2 and 3, in which it is illustrated as consisting of a metal strip or plate inserted between the meeting portions of the press-chamber sections at one side of the machine and held by the bolts 18. The operative portion of the baffles consists of one or more inset projections or extensions 20 of proper extent to lie between the sets of longer threads 9, where said projecting portions of the baffles enter and engage the material and offer a positive means for preventing the turning of the mass within the press-chamber and also insure the proper feeding of the material through the press and its delivery therefrom.

At the discharge end of the press-chamber is arranged a resistance or pressure plate 21, circular in shape and provided with an outwardly-contracting discharge-orifice 22, through which the compressed material passes in being delivered from the press. The outwardly-projecting flange of said plate is provided with openings to receive bolts 23, which also project from the end of the press-chamber and render the resistance-plate adjustable toward and away from the discharge end of the press-chamber for giving greater or less compression to the material as it escapes from the press. The bolts 23 pass through the plate 21 and receive nuts outside of said plate. By turning said nuts the position of the resistance-plate 21 may be varied, and by removing said nuts the plate 21 may be detached, after which the hinged section of the press-chamber may be thrown open to give access to the interior of the chamber.

In Fig. 2 it will be observed that the rear end portion of the body 7 of the feed-screw is made cylindrical instead of tapering, as in Fig. 1. This is found desirable in some instances in order to hold the meal or other material in drainage for a part of the time just prior to delivery from the machine. It will also be noted by reference to Fig. 6 that the drain-ports decrease in size as the rear ends of the slats are approached, but increase in number or are arranged closer together, such arrangement having been found of advantage in use to more effectively admit of the escape of the liquid.

The feeder consists of outer and inner members 24 and 25, respectively, as best shown in Fig. 8, the outer member being in the form of a drum made up of segment-bars 25', between which are left inwardly-flaring spaces 26 to permit the sliding movement of a plurality of blades or wings 27, having a pivotal connection at their inner ends with the inner member 25. This connection is preferably made by providing the wings at their inner ends with cylindrical enlargements 28, received in corresponding sockets in the inner member 25, as shown, such arrangement permitting the wings to turn or oscillate as they move outward and inward relatively to the outer drum. The members 24 and 25 are both mounted in a casing 29, leading into the press-chamber, and also provided with a segmental offset 30, in which the projecting portions of the blades or wings 27 move in a downward direction for forcing the material in a corresponding direction into the press-chamber. The drum 24 is provided with a hollow shaft 31, mounted in bearing-standards 32, while the shaft of the inner member passes through the drum and is journaled in bearings 33 outside of and beyond the bearings 32. The two axes of rotation are eccentric to each other, as shown in Figs. 7, 8, and 9, and in order to cause both members to rotate together a coupling device or key 34 is secured to one of the members, as shown at 35, and has a sliding engagement and interlocked connection with the other member by passing the same through a loop or keeper 36, as shown in Fig. 9. Under the arrangement described the two rotary members of the feeder, while eccentrically arranged, are driven together at the same speed, causing the outer ends of the blades or wings to be alternately projected and withdrawn in the manner illustrated in Fig. 8.

Having thus described the invention, what is claimed as new, and desired to be secured by Letters Patent, is—

1. In a press, a feed-screw having threads of alternately increasing and decreasing diameter.

2. In a press, a feed-screw having threads of different size so arranged that the threads of one size alternate with threads of another size.

3. In a press, a feed-screw comprising a tapering shaft, and threads of different sizes so arranged that threads of a greater diameter alternate with threads of a lesser diameter.

4. In a press, a feed-screw having threads for advancing and threads for dividing the material, the said different kinds of threads being arranged alternately.

5. In a press, a feed-screw comprising a tapering shaft, and having thereon threads for advancing and threads for dividing the material, the said different kinds of threads being arranged to alternate.

6. A press comprising a cylindrical press-chamber, and a feed-screw therein embodying a tapering shaft having advancing-threads and dividing-threads, the said different kinds of threads being arranged to alternate.

7. A press comprising a cylindrical press-chamber, and a feed-screw therein embodying a tapering shaft, dividing-threads which extend outward close to the inner wall of the press-chamber, and advancing-threads of relatively smaller diameter arranged to alternate with the dividing-threads.

8. A press comprising a cylindrical press-chamber, and a feed-screw therein comprising a tapering shaft having dividing-threads of uniform diameter, and advancing-threads of progressively-increasing diameter which are arranged to alternate with the dividing-threads.

9. In a press, a feed-screw comprising a shaft made tapering for a portion of its length and cylindrical for the remainder of its length, and means on said shaft for feeding or advancing the material along the press-chamber.

10. In a press, a feed-screw comprising a shaft made tapering for a portion of its length and cylindrical for the remainder of its length, and threads extending along both of such shaft portions.

11. In a press, a press-chamber, a feed-screw working therein, a resistance-plate having an outwardly-contracting discharge-orifice and adjustable toward and away from the discharge of the press-chamber, and means for holding said plate rigid when adjusted.

12. In a press, a press-chamber, a feed-screw working therein, and an annular resistance-plate having a conico-cylindrical orifice and made adjustable toward and away from the discharge of the press-chamber.

13. In a press, a press-chamber, a feed-screw working therein, and a stationary baffle within the press-chamber for preventing rotation of the material as it is acted on by the feed-screw.

14. In a press, a press-chamber, a feed-screw working therein, and a series of stationary baffles ranged along the press-chamber to counteract the tendency of the feed-screw to turn the material within said chamber.

15. In a press, a press-chamber, a feed-screw working therein, and one or more stationary baffles detachably connected with the press-chamber.

16. In a press, a press-chamber composed of a circular series of slats extending lengthwise thereof and arranged to leave intervening outwardly-expanding exits, and also formed with strainer-passages in their abutting faces, and strainers arranged in said passages.

17. In a press, a press-chamber composed of a circular series of slats extending lengthwise thereof and arranged to leave outwardly-expanding exits between them and having flat parallel abutting faces, and drain-ports formed in the abutting faces of said slats and leading outward from the press-chamber.

18. In a press, a press-chamber composed of a circular series of slats extending lengthwise thereof and arranged to leave intervening outwardly-expanding exits, and also formed with strainer-passages and drain-ports leading outward from said passages, and strainers arranged in the strainer-passages.

19. A press comprising a press-chamber, a feed-screw working therein, and a feeder embodying a casing, a rotary drum working therein, and feathering-blades mounted within the drum and connected therewith by roller-joints and projecting through the periphery of the drum, said blades being rotatable on an axis eccentric to the axis of the drum.

20. A press comprising a press-chamber, a feed-screw working therein, and a feeder embodying a casing, a rotary drum working therein, feathering-blades mounted in the drum and having a jointed connection with a shaft mounted within the drum, and a key made fast to said shaft and having a sliding engagement with the drum.

21. A press comprising a press-chamber, a feed-screw working therein, and a feeder embodying a casing, outer and inner rotary members, feathering-blades connected to the inner member and working through the periphery of the outer member, and a key fast to one of said members and having a sliding connection with the other member.

In testimony whereof we affix our signatures in presence of two witnesses.

JOHN C. FIDDYMENT.
JOHN J. McNALLY.

Witnesses for John C. Fiddyment:
F. E. LAPP,
N. E. HOUSE.

Witnesses for John J. McNally:
J. RAYMOND PRITCHARD,
R. RANDOLPH WILES.